United States Patent [19]

Hügli

[11] Patent Number: 4,743,971

[45] Date of Patent: May 10, 1988

[54] APPARATUS FOR TIMING SPORTING EVENTS

[75] Inventor: Heinz Hügli, Neuchâtel, Switzerland

[73] Assignee: Compagnie des Montres Longines, Switzerland

[21] Appl. No.: 926,066

[22] Filed: Nov. 3, 1986

[30] Foreign Application Priority Data

Nov. 4, 1985 [FR] France .................. 85 16423

[51] Int. Cl.$^4$ .............................. H04N 3/14
[52] U.S. Cl. .................. 358/213.26; 358/213.19
[58] Field of Search ............... 358/213.26, 213.29, 358/213.31, 109, 213.19; 250/578

[56] References Cited

U.S. PATENT DOCUMENTS

| 3,678,189 | 7/1972 | Oswald | 178/6.7 R |
| 3,833,762 | 9/1974 | Gudmundsen | 358/213.31 |
| 4,009,333 | 2/1977 | Berger | 358/213 |
| 4,280,141 | 7/1981 | McCann et al. | 358/213.19 |
| 4,382,267 | 5/1983 | Angle | 358/213.19 |
| 4,591,727 | 5/1986 | Gaebelein et al. | 358/213.31 |

FOREIGN PATENT DOCUMENTS 0064298 11/1982 European Pat. Off.
2535539 2/1976 Fed. Rep. of Germany.
1045434 10/1966 United Kingdom.

OTHER PUBLICATIONS

Uhrentechnische Forschung Und Entwicklung, No. 2, 1972, pp. 105–111.
The Radio & Electronic Engineer, vol. 50, No. 5, May 1980, pp. 205–212.

Primary Examiner—Jin F. Ng
Assistant Examiner—Stephen Brinich
Attorney, Agent, or Firm—Griffin, Branigan & Butler

[57] ABSTRACT

The apparatus is a motion picture camera including a charge coupled photosensitive device provided with a multiplicity of unit sensors. The sensors are arranged in a matrix of M rows and N columns.

The apparatus is equipped with a pulse generator for controlling the transfer of charges from sensor to sensor along the columns, the frequency of the pulses being adjusted to effect substantial correspondence between the speed of charge transfer and the speed of the image moving over the device. A shift register is arranged at the end of the columns so as to receive in parallel information from said columns and to transmit it in series to an output circuit for reconstitution of the image.

The apparatus is used for timing sporting events.

This invention concerns an apparatus for timing sporting events including a motion picture camera installed at a fixed position and having a lens the axis of which is directed onto a line to be crossed by competitors so as to record the events occurring on said line.

3 Claims, 3 Drawing Sheets

APPARATUS FOR TIMING SPORTING EVENTS

BACKGROUND OF THE INVENTION

Several devices corresponding to the above general definition have already been proposed. They permit the obtaining of an image of the course at the moment when the competitors cross a determined line, in particular the finish line. The image takes account moreover of the photographic identity of each of the runners and of the rank which they occupy relative to one another thanks to a time scale which is recorded on the same image.

One of the oldest of such arrangements generally called photofinish, is known from the Swiss Pat. No. 399.028 (=GB No. 1.045.434). It includes an apparatus comprising a photographic camera the film of which advances with uniform motion, means arranged to photograph only a narrow space or one line at a time, and means enabling the projection of time indications to be recorded on the film.

This apparatus is illustrated on FIG. 1 of this description. The moving body is displaced at a speed Vm in front of the lens 1 of the camera. Behind the lens is to be found a screen 4 provided with a slot 2. Behind the slot runs a photographic film 3. The image of the moving body moves at the speed Vi in front of the screen while the film runs at the speed V. An adjustment is made so that the speed V is as close as possible to the speed Vi. The effect of the slot is that the film receives only a part of the entire image seen by the lens, this part being one line of the image. The running of the film behind the slot has as effect to expose the film successively in time with the same line of the image. The photofinish thus records a bidimensional image which represents according to an axis (perpendicular to FIG. 1), the profile of the intensity of a line of the image and in accordance with the other axis (in the plane of FIG. 1), the time evolution of this profile. The visual analysis of the image enables reconstituting the order in time of the appearance of different moving bodies in the field of the line. Finally, by the addition onto the film of reference points giving information on the exact time of recording, the appearance of the different moving bodies may be measured in time. This arrangement is employed for instance to measure the order and the time of passage of competitors over a finish line.

In the system which has just been described, the exposure time Te of film 3 is the time of transit of this film behind slot 2, i.e. $Te = \delta/V$, if $\delta$ is the width of the slot. In practice, there is desired an exposure time of the film which is as great as possible, so as to enable taking views of subjects poorly illuminated or passing at high speed. This exposure time is at the same time limited by the blurring of the image materialized for instance by trails appearing at the edge of the moving body and which are provoked by a difference of speed between the speed V of the film and the speed Vi of the image of the moving body. This blurring determines the time resolution of measurement.

The phenomenon of blurring may be explained by means of FIG. 2 which reproduces at an enlarged scale a part of FIG. 1 including screen 4 and slot 2. In this figure there has been represented the same point P of the image of the moving body which is displaced from A to B at speed Vi. During the same time lapse, the film is driven at a speed V slightly less than Vi in a manner such that when the image has advanced from A to B the film advances only from A to C. There results therefrom a trail from the point P which will leave an impression on the film over a length $\Delta x$ which is a representation of the spatial blurring. To this spatial blurring there naturally corresponds a temporal blurring Tf which may be put into relationship with the exposure time Te of the film and which takes into account the spread between the speeds V and Vi. This relationship may be given as follows:

$$Tf = \mu \cdot Te \quad (1)$$

$$\text{where } \mu = \frac{V - Vi}{V}$$

In case speeds V and Vi are substantially equal, the factor $\mu$ approaches zero and it follows that $Tf << Te$, which signifies that the exposure time is much greater than the temporal blurring.

Here there may be cited a practical example drawn from an athletic course. The film of the camera is adjusted to a speed V of 35 mm/sec. The image of the course moves past in reality at the speed Vi of 28 mm/sec, giving a factor $\mu$ of 0.2. If one specifies a temporal blurring Tf of 1 ms, there will result therefrom an exposure time Te of 5 ms according to the relationship (1) given hereinabove.

There results from what has just been said that the photofinish as known today is advantageous in view of the comfortable time of exposure which it provides. At the same time, it exhibits certain disadvantages. It requires in effect a chemical development of the film which delays access to the results of the course. It requires good accessibility to the camera which limits its utilization to certain positions. There may also be mentioned its relatively great space requirement and mediocre reliability in view of the mechanical parts making up its construction.

To overcome these difficulties, the assignee of the present invention has disclosed in Swiss Pat. No. 590.518 another system for determining the time separating the passages of moving bodies across a reference line substantially perpendicular to their trajectory. This system consists of employing a television camera which is directed onto the reference line, recording the signals provided by said camera and simultaneously signals furnished by time keeping means, and reproducing these signals by the aid of a monitor. In order to realize this, there is employed a camera by means of which a linear unidirectional scan is effected coinciding with the reference line, and a pickup effecting a linear bidirectional scan in a manner such that the successive scans of the reference line by the camera are spread out over the screen of the pick-up in a direction perpendicular to that in which is effected the unidirectional scans, that is to say in the direction of the trajectory of the moving bodies. This patent mentions that such camera may be of a conventional type, but wherein however the two scans have been permuted in a manner such that the more rapid scan is effected according to the vertical direction, the slower scan having been suppressed. As a variant it is mentioned that preferably a camera will be employed using diodes of the solid state type.

This system is shown on FIGS. 3 and 4 of the present description. Here the moving body is displaced at the speed Vm in front of the lens 1 of the camera. Behind the lens there is placed a unidimensional photosensitive device 5 using solid state sensors. The image of the moving body runs at speed Vi in front of the device 5.

FIG. 4 shows how the device is built such including a row of photosensitive unit sensors 6 disposed side by side. The incident light coming from the reference line to be sensed produces charges on each of these sensors which charges represent the intensity profile of the line of the image at a given instant. These charges are periodically transferred in the sense of arrows 9 into a shift register 7 bearing as many elements 8 as the sensor 6. A clock signal 12 operating at high frequency transfers the contents of the line towards amplifier 10 in the form of a video signal 11. These video signals are then memorized, and subsequently visualized in a manner to represent in the form of an image the temporal evolution of the line under observation (finish line for instance).

Several uni-dimensional devices are presently available on the market. They are all equipped with a substantial number of sensors (>1000) to assure high resolution. For further details on this subject, reference may be had to the technical notes of the manufacturers, for instance to the note concerning the device TH 7803 of Thomson-CSF. One may even obtain complete cameras from the Fairchild company under the reference CCD 1100C to 1500C.

In the system which has just been described, it has been seen that the incident light produces charges on the row of sensors 6 which charges are periodically transferred towards the output 10 via the shift register 7. The selection of the duration of this period which will be referred to as To, determines at the same time that of the exposure time Te and of the temporal blurring Tf which, since here the sensor is stationary, is equal to:

$$Tf = Te = To \qquad (2)$$

Thus, to repeat the same example suggested with reference to the photofinish, and if here one determines the temporal blurring Tf to be 1 ms, the exposure time Te is equal to 1 ms. It is understood that the unidimensional system is less favourable than the photofinish since it presents a relationship Tf/Te equal to 1, while the relationship was equal to $\mu$ in the system employing the photofinish.

There results from what has just been said that the unidimensional system as discussed above exhibits low luminous sensitivity which limits its range of application to scenes which have a substantial illumination.

SUMMARY OF THE INVENTION

To overcome the difficulties presented by both of the two systems described hereinabove, the apparatus provided in accordance with the present invention, is characterized by the fact that the camera comprises a bidimensional photo-sensitive charge coupled device including a multiplicity of sensors arranged in rows and columns, the rows being in a direction parallel to the image of the line of passage of the course, and the columns being in the direction of the running of the course and a pulse generator is provided for controlling the transfer of charges from sensor to sensor along the columns, the frequency of the pulses being adjusted to effect substantial correspondence between the speed of charge transfer and the speed of the image moving over the device, a shift register being arranged at the end of the columns so as to receive in parallel information from said columns, and to transmit it in response to a clock signal in series to an output circuit so as to reconstitute row by row the image received by the device.

DESCRIPTION OF THE PREFERRED EMBODIMENT

Figure 1:
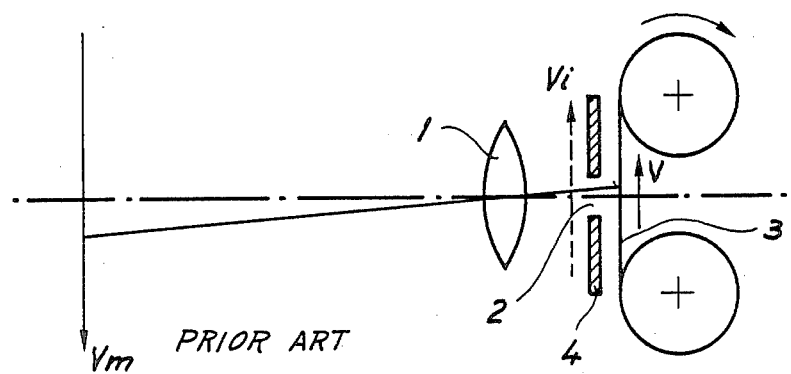
FIGS. 1 and 2 represent the prior art as discussed hereinabove with reference to the photofinish system.
Figure 2:
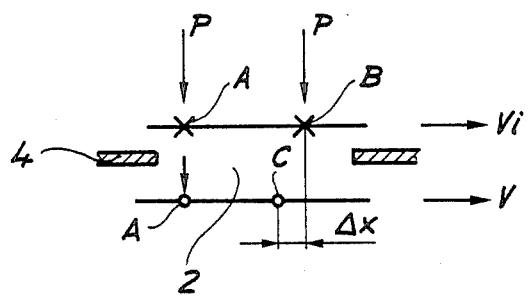
Figure 3:
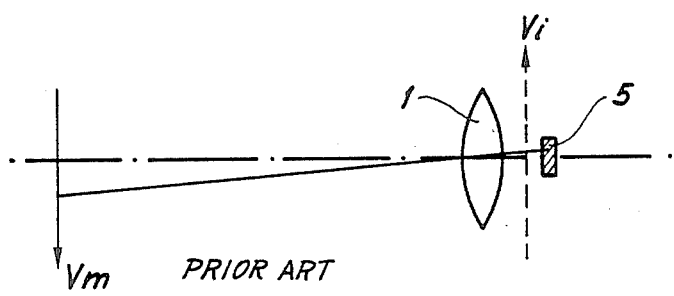
FIGS. 3 and 4 likewise represent the prior art as discussed hereinabove relative to a linear or unidimensional device with photo-sensitive unit sensors.
Figure 4:
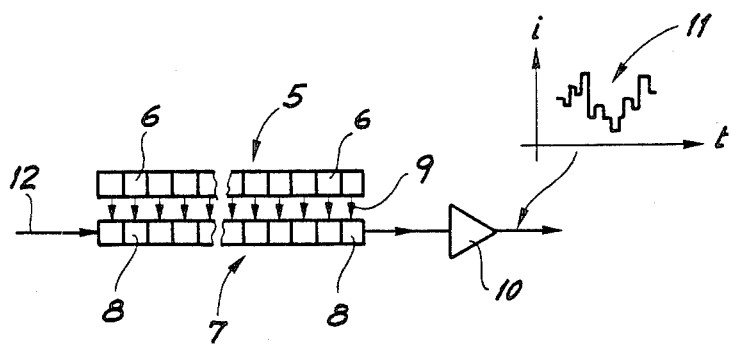
Figure 5:
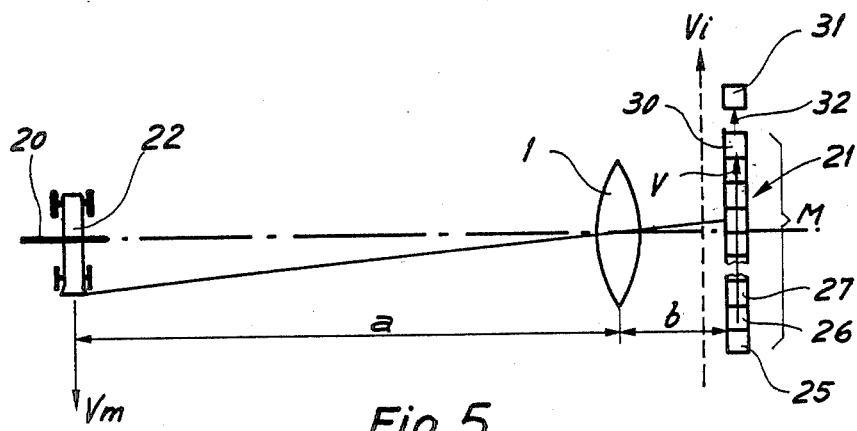
FIG. 5 is a schematic representation of the motion picture apparatus according to the invention.

FIG. 5 shows schematically a motion picture camera arranged in accordance with the invention for timing sporting events. This camera is installed at a fixed position, the axis of its lens 1 being directed onto a line 20 over which competitors must pass (departure line, intermediate line or finish line). Behind lens 1 there is placed a charge coupled photo-sensitive device 21 which will be subsequently described. A moving object 22 is displaced over a track of the course at speed Vm. The image of this moving body is displaced over the photosensitive device at the speed Vi. If the distances a and b represent respectively the distance from the lens to the moving body and the distance from the lens to the device, the speed Vi will be:

$$Vi = \frac{b}{a} Vm$$

Figure 6:
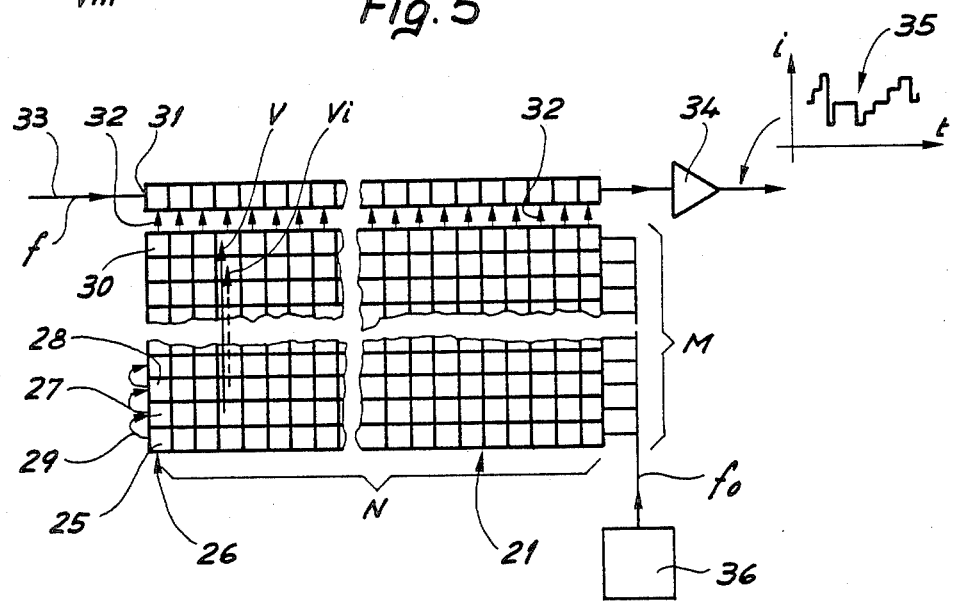
FIG. 6 is a front view of the photo-sensitive device equipping the motion picture apparatus according to the invention.
Figure 7:
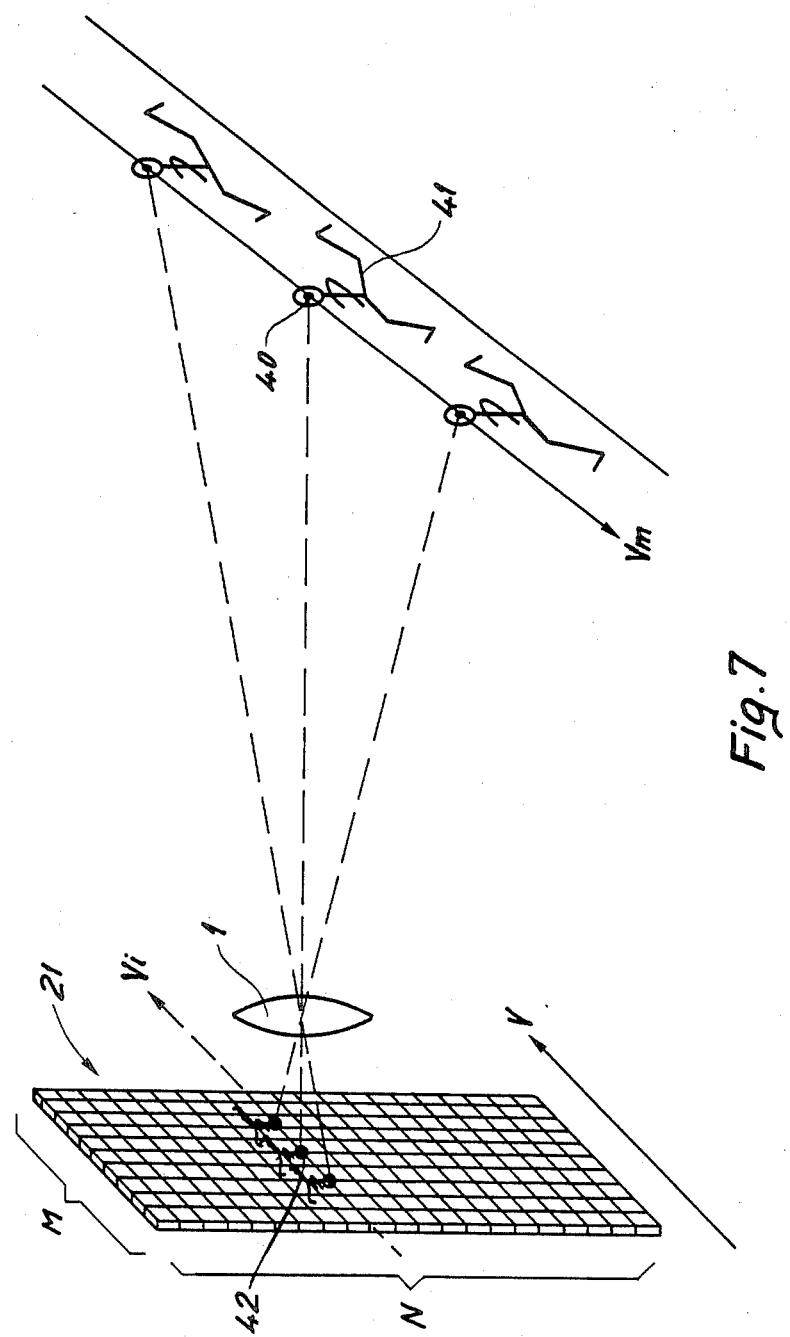
FIG. 7 is a schematic view in perspective of the apparatus according to the invention.

The photosensitive charge coupled device is shown in a facing view on FIG. 6. It includes a multiplicity of unit sensors arranged in rows and in columns, i.e. M rows and N columns. In the arrangement provided here, such rows are directed parallel to the image of the passage line of the course and the columns are arranged in the sense of the running of said course. Thus, as will be best seen on the perspective view of FIG. 7, the course image runs over the device 21 in the sense of the M elements comprising the columns.

The photosensitive bidimensional device 21 is known in itself. A detailed description of an example thereof is given in a technical note of "Itek Optical Systems" 10 Maguire Road, Lexington, Mass. 02173, such note being entitled "VL-96 A, High-Performance Linear Solid State Imaging Device". It is defined by the note under the designation "Linear Solid-State Imaging Device Using Time—Delay-And-Integrate TDI Operation". Herein this element will be referred to as a bidimensional photosensitve charge coupled device. It contains 2048 columns and 96 rows. Each unit sensor extends over a surface of approximately $13 \times 13 \ \mu m^2$. The device is conceived in a manner such that the charges accumulated on each of the unit sensors may be transferred to neighboring sensors in the sense of the columns. Thus, returning to FIG. 6, the charge accumulated on sensor 25 of column 26 may be transferred onto sensor 27 of the same column, then onto sensor 28 and so on according to the direction of arrows 29. It is the same and in a synchronous manner for the N columns of the device. The last charge 30 of column 26 is transferred at the same rhythm as the transfers of the other columns to a shift register 31. Thus the shift register 31 arranged at the end of the columns receives information in parallel coming from said columns according to the direction of arrows 32. As soon as the information has been stored in the shift register 31, such may be transferred in series responsive to a clock signal 33 to an output circuit 34 generally formed by a transistor JFET. The output signal of this transistor is in analog form 35 and represents the profiles of intensity of the line of passage at successive instants. The transfer of charges from one sensor to the other in the sense of the columns is obtained by a pulse generator 36 the frequency of which may be varied.

A basic characteristic of this invention resides in the adaptation of the speed of charge transfer represented by V and controlled by the pulse generator 36 to the speed of displacement Vi of the image over the photosensitive device. If speeds V and Vi are adapted to one another or if preferred, are equal, it will be understood that each elementary charge always follows the same point of the object in motion. This is particularly apparent on FIG. 7. There will be noted as example the eye 40 of runner 41 being displaced along the course track at speed Vm. The image of this eye 42 is displaced at the speed Vi after having passed through lens 1. If the speed V of charge transfer from one sensor to another in the direction of the columns N is adapted to the speed Vi and if each column contains for instance 96 sensors, the charge accumulated by the luminous intensity produced by such eye onto the first sensor will be transferred onto the second sensor which will receive at this instant likewise the image of the same eye and thus following until the 96th sensor. There may be seen from this teaching that the exposure time is multiplied by a factor equal to the number of sensors M to be found in one column. This increase of the exposure time enables improving the performance of the image capture and measurement in one or several of the following characteristics: scenes with poor illumination, greater resolution of the image, capture of images having very rapid movements.

If the transfer of elementary charges as well as the reading from a row of the image are effected at regular intervals of period To, it will be understood that with a bidimensional photosensitvie device comprising M sensors in the sense of one column, the exposure time Te will be:

$$Te = M \cdot To$$

If one takes into account the spread of speed between V and Vi as defined hereinabove (photofinish) by $$\mu = \frac{V - Vi}{V}$$

there may be specified the amount of temporal blur Tf which is:

$$Tf = To + Te \cdot \mu$$

In replacing To by its value, there is found:

$$Tf = Te \left[ \frac{1}{M} + \mu \right] \quad (3)$$

It is seen that the temporal blur comprises the addition of the factors which characterized on the one hand the photofinish (equation 1) and on the other hand the unidirectional device (equation 2) which have been described in the introduction to the present description. In the case of this invention, the relationship Tf/Te is valued at $1/M = \mu$, this enabling one to say that the bidimensional photosensitive device gives results comparable to those of the photofinish, but without having the disadvantages thereof. Effectively, in choosing a number of sensors relatively high, the temporal blur is reduced as in the photofinish to the portion $\mu \cdot Te$. Conversely, if the speed match is perfect ($\mu = 0$) the temporal blur is limited to Te/M.

Thus, repeating the same example suggested with reference to the systems known to the prior art and setting a temporal blur Tf of 1 ms, the exposure time Te for factor $\mu$ of 0.2 and the number of sensors M at 96 will amount to 4.76 ms, this having been respectively 5 ms and 1 ms for the photofinish and the unidimensional device.

Figure 8:
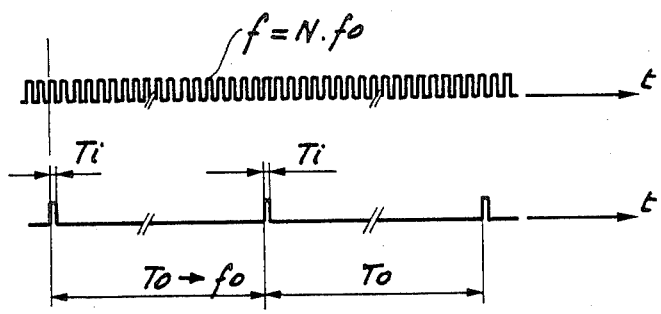
FIG. 8 is a diagram representing the control signals of the device as a function of time.

There has been seen with reference to FIG. 6 that the pulse generator 36 controls the charge transfer from one sensor to the next. These short duration pulses Ti are shown on the diagram of FIG. 8. They are repeated at the rhythm To which defines the transfer rate. Between the short duration pulses Ti the luminous charges are accumulated on each of the unit sensors.

In order to read the row of the photosensitive device which has just been transferred into the shift register 31, there is required a clock signal, the frequency f of which is N times greater than the frequency Fo corresponding to the period To, N being equal to the number of columns of the device. Thus, the frequency of the clock signal will be adjusted to be equal to $$f = N \cdot fo$$

The pulse generator 36 providing the frequency fo may be controlled by a clock signal, for example by means of a divide by N circuit.

An example drawn from an athletic course will facilitate appreciation of the order of magnitude of the signals. It has already been seen that the image of such a course runs over the photosensitive device at a speed of 35 mm/s. If the unit sensor has a square surface the side of which is equal to $13 \cdot 10^{-3}$ mm, the time To during which a point of the image rests in contact with the same sensor is $13 \cdot 10^{-3}/35 = 0.371 \cdot 10^{-3}$ S, this giving a transfer frequency fo=2695 Hz. If the device is provided with 2048 columns, the clock frequency will be $f = 2048 \cdot 2695 \cong 5.5$ MHz. For an automobile race, the speed of the image may attain 200 mm/s. At this value a similar calculation will give fo=15.4 kHz and f=31.5 MHz. This is probably to be considered the highest speed which one will encounter within the range of application of the apparatus according to the invention. Conversely, it will be noted that the slowest speed likely to be encountered will be that during boat races and which is on the order of 4 mm/s and for which fo=307 Hz and f=0.628 MHz.

From the examples which have just been given two remarks may be made:

Initially, the apparatus in accordance with the invention in order to be adapted to every competition which may arise, must be able to adapt its reading speed V to the speed Vi of the image of the course. This adaptation may be automatically accomplished by measuring the speed Vi and an appropriate slaving of V to Vi. It could likewise be obtained manually by means of a regulating knob as is presently practised with the photofinish. Whether one chooses one or the other of these methods, the regulation will be applied finally to the pulse generator 36 in order to vary its frequency fo for instance between 300 and 16,000 Hz in order to provide a margin of security in view of the figures indicated hereinabove. This regulation could also be applied to the frequency f of the clock signal since $f=N \cdot fo$ and N is a fixed number depending from the number of columns in the photosensitive device. It should be specified here that the transfer frequency fo between 300 and 16,000 Hz is understood to be for a specific lens and for a well defined dimension of the sensors. If the focal distances a and b defined hereinabove are altered and if the sensor provides other dimensions than that of $13 \times 13$ mentioned hereinabove, the transfer frequency may extend between other limits.

In other respects, each row of the image is well defined in time because of the transfer frequency fo. To each row there thus corresponds a defined time of day which enables the utilization of this frequency as a time base for marking the image in time. Thanks to this arrangement, it is possible to blend the image of the output with a time scale. It will be understood thence that the shortest time that one will be able to appreciate will be that given by the transfer frequency fo since to each transfer there corresponds a row of the image and a time which may be attributed to this row. Thus for the speeds given as an example hereinabove, the time separating one row from the neighbouring row is respectively of 3.25 ms, 0.37 ms and 0.065 ms for boating courses, athletic courses and automobile courses.

The analog signal of the row represented at 35 on FIG. 6 is employed for reconstituting the image of the moving body on the screen according to the known techniques associated with television. The row frequency will naturally be synchronized with the frequency of charge transfer fo. The reconstructed image may appear on a CRT screen, be magnetically recorded by a video recorder or appear on a paper support.

The reconstructed image may appear in black and white or in colour. In the latter case, three photosensitive charge coupled devices will be employed, each receiving for instance by interposed filters a different basic colour.

What I claim is:

1. An apparatus for timing sporting events including a motion picture camera installed at a fixed position and having a lens, the axis of which is directed onto a line to be crossed by competitors so as to record the events occuring on said line, said camera comprising a bidimensional photosensitive charge coupled device including a multiplicity of sensors arranged in rows and columns, the rows being in a direction parallel to said line and the columns in the direction of the running of the course and a pulse generator for controlling the transfer of charges from sensor to sensor along the columns, the frequency of the pulses being adjusted to effect substantial correspondence between the speed of charge transfer and the speed of the image moving over the device, a shift register being arranged at the end of the columns so as to receive in parallel information from said columns and to transmit it in response to a clock signal in series to an output circuit so as to reconstitute row by row the image received by the device, the pulses furnished by the generator controlling the charge transfers being employed as a time base at a time scale corresponding to the events being recorded, said scale being blended into the image resulting from said events.

2. An apparatus as set forth in claim 1 wherein the frequency of the pulse generator is manually adjustable by an operator so as to adapt the speed of charge transfer to the speed of the course image.

3. An apparatus for timing sporting events including a motion picture camera installed at a fixed position and having a lens, the axis of which is directed onto a line to be crossed by competitors so as to record the events occuring on said line, said camera comprising a bidimensional photosensitive charge coupled device including a multiplicity of sensors arranged in rows and columns, the rows being in a direction parallel to said line and the columns in the direction of the running of the course and a pulse generator for controlling the transfer of charges from sensor to sensor along the columns, the frequency of the pulses being adjusted to effect substantial correspondence between the speed of charge transfer and the speed of the image moving over the device, a shift register being arranged at the end of the columns so as to receive in parallel information from said columns and to transmit it in response to a clock signal in series to an output circuit so as to reconstitute row by row the image received by the device, the frequency of the pulse generator being manually adjustable by an operator so as to adapt the speed of charge transfer to the speed of the course image.

* * * * *